United States Patent
Chen et al.

(10) Patent No.: US 10,142,402 B2
(45) Date of Patent: Nov. 27, 2018

(54) METHODS AND APPARATUSES FOR SENDING PROMPT MESSAGE TO CLOSE A MOVABLE ARTICLE

(71) Applicant: Xiaomi Inc., Beijing (CN)

(72) Inventors: Changbing Chen, Beijing (CN); Hao Chen, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 372 days.

(21) Appl. No.: 15/001,818

(22) Filed: Jan. 20, 2016

(65) Prior Publication Data

US 2016/0184755 A1 Jun. 30, 2016

Related U.S. Application Data

(63) Continuation-in-part of application No. PCT/CN2015/093905, filed on Nov. 5, 2015.

(30) Foreign Application Priority Data

Dec. 29, 2014 (CN) .......................... 2014 1 0836852

(51) Int. Cl.
*H04L 29/08* (2006.01)
*G05B 15/02* (2006.01)

(52) U.S. Cl.
CPC .............. *H04L 67/10* (2013.01); *G05B 15/02* (2013.01); *H04L 67/12* (2013.01); *G05B 2219/2614* (2013.01); *G05B 2219/2642* (2013.01)

(58) Field of Classification Search
CPC ..... H04L 67/10; H04L 67/12; H04L 12/2809; H04L 12/2823; H04L 12/2816; G05B 15/02; G05B 2219/2642; G05B 2219/2614
See application file for complete search history.

(56) References Cited

U.S. PATENT DOCUMENTS

2008/0186148 A1 8/2008 Kwon et al.
2008/0202135 A1 8/2008 Francis
(Continued)

FOREIGN PATENT DOCUMENTS

CN 102117063 A 7/2011
CN 102495617 A 6/2012
(Continued)

OTHER PUBLICATIONS

International Search Report and Written Opinion (including English translation) issued in corresponding International Application No. PCT/CN2015/093905, dated Feb. 16, 2016, 21 pages.
(Continued)

*Primary Examiner* — David Lam
(74) *Attorney, Agent, or Firm* — Arch & Lake LLP

(57) ABSTRACT

A method and an apparatus are provided for sending a prompt message. The apparatus receives a status of a movable article corresponding to a sensor. The apparatus obtains a working status of an air cleaner bound with the sensor when the movable article corresponding to the sensor is in an open status. The apparatus detects whether the working status of the air cleaner is an on status. The apparatus sends the prompt message in a predetermined manner when it is detected that the working status of the air cleaner is the on status, in which the prompt message is configured to indicate to close the movable article in a room containing the air cleaner or to turn off the air cleaner.

20 Claims, 5 Drawing Sheets

(56) References Cited

U.S. PATENT DOCUMENTS

2015/0285526 A1\* 10/2015 Smith .................... F24F 11/30
　　　　　　　　　　　　　　　　　　　　　　　700/276
2015/0369505 A1\* 12/2015 Malve .................. H04W 4/008
　　　　　　　　　　　　　　　　　　　　　　　700/276

FOREIGN PATENT DOCUMENTS

| | | |
|---|---|---|
| CN | 202613686 U | 12/2012 |
| CN | 103901850 A | 7/2014 |
| CN | 103940031 A | 7/2014 |
| CN | 104615003 A | 5/2015 |
| JP | H0516665 A | 1/1993 |
| JP | 2010139099 A | 6/2010 |
| JP | 2014017969 A | 1/2014 |
| WO | 2010140090 A1 | 12/2010 |
| WO | 2012101787 A1 | 8/2012 |
| WO | 2014129193 A1 | 8/2014 |
| WO | 2014167837 A1 | 10/2014 |

OTHER PUBLICATIONS

First Office Action (including English translation) issued in corresponding Chinese Patent Application No. 201410836852.4, dated Aug. 25, 2016, 19 pages.
Extended European Search Report issued in corresponding EP Application No. 15823123, dated Sep. 14, 2016, 13 pages.
Notification of Reasons for Refusal (including English translation) issued in corresponding Japanese Patent Application No. 2016-567126, dated Apr. 18, 2017, 6 pages.
Notification of Reason for Refusal (including English translation) issued in corresponding Korean Patent Application No. 10-2016-7004470, dated May 22, 2017, 13 pages.
Office Action issued in corresponding Russian Patent Application No. 2016108118/11(012859), dated May 24, 2017, 5 pages.

\* cited by examiner

METHODS AND APPARATUSES FOR SENDING PROMPT MESSAGE TO CLOSE A MOVABLE ARTICLE

CROSS-REFERENCE TO RELATED APPLICATIONS

This application is a continuation-in-part of International Application No. PCT/CN2015/093905, filed on Nov. 5, 2015, which is based on and claims priority to Chinese Patent Application No. 201410836852.4, filed on Dec. 29, 2014, the entire contents of which are incorporated herein by reference.

FIELD

The present disclosure relates to a field of intelligent household technology, and more particularly, to a method for sending a prompt message and an apparatus for sending a prompt message.

BACKGROUND

An air cleaner can absorb, break down or transform various air pollutants (generally including PM2.5, pollen, methanal, etc.) to improve air cleanness effectively, so the air cleaner has been widely applied in households.

The air cleaner may purify air, but if a door or window in a room where the air cleaner is located is not closed, it is hard to obtain a better effect of air purification even though the air cleaner works for a long time.

SUMMARY

Embodiments of the present disclosure provide a method for sending a prompt message and an apparatus for sending a prompt message, so as to solve the defects in the related art.

According to a first aspect of the present disclosure, there is provided a method for sending a prompt message. The method includes: receiving a status of a movable article corresponding to a sensor; obtaining a working status of an air cleaner bound with the sensor when the movable article corresponding to the sensor is in an open status; detecting whether the working status of the air cleaner is an on status; and sending the prompt message to the movable article in a predetermined manner when detecting that the working status of the air cleaner is the on status, where the prompt message is configured to indicate to close the movable article in a room containing the air cleaner or to turn off the air cleaner.

According to a second aspect of the present disclosure, there is provided an apparatus for sending a prompt message. The apparatus includes: a first receiving circuitry configured to receive a status of a movable article corresponding to a sensor; an obtaining circuitry configured to obtain a working status of an air cleaner bound with the sensor when the movable article corresponding to the sensor is in an open status; a detecting circuitry configured to detect whether the working status of the air cleaner is an on status; and a first sending circuitry configured to send the prompt message in a predetermined manner when the detecting circuitry detects that the working status of the air cleaner is the on status, where the prompt message is configured to indicate to close the movable article in a room containing the air cleaner or to turn off the air cleaner.

According to a third aspect of embodiments of the present disclosure, there is provided an apparatus for sending a prompt message. The apparatus includes: a processor, and a memory configured to store an instruction executable by the processor, in which the processor is configured to: receive an open/closed status of a movable article corresponding to a sensor; obtain a working status of an air cleaner bound with the sensor when the movable article corresponding to the sensor is in an open status; detect whether the working status of the air cleaner is an on status; and send the prompt message in a predetermined manner when detecting that the working status of the air cleaner is the on status, the prompt message being configured to indicate to close the movable article in a room containing the air cleaner or to turn off the air cleaner.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment,"

"in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Figure 1:
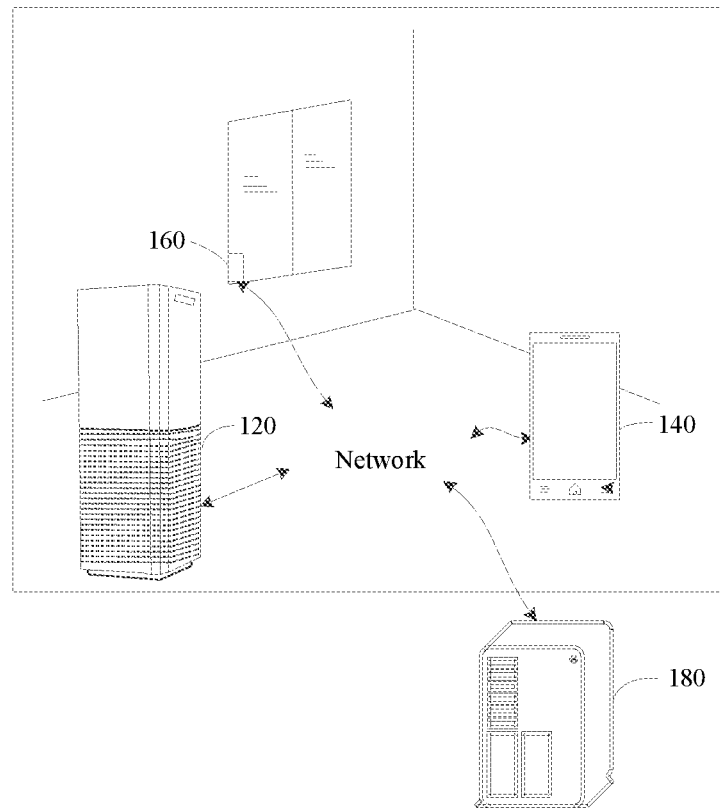
FIG. 1 is a schematic diagram of an implementation environment involved in a method for sending a prompt message according to some exemplary embodiments.

FIG. 1 is a schematic diagram of an implementation environment involved in a method for sending a prompt message according to some exemplary embodiments. As shown in FIG. 1, the implementation environment may include an air cleaner 120, an electronic device 140, a sensor 160 and a network-side device 180.

The air cleaner 120 may purify air and detect air quality.

The electronic device 140 may establish connection with the air cleaner 120 in a wired network manner or in a wireless network manner (such as wireless-fidelity (Wi-Fi) or Bluetooth), and interact with the air cleaner 120 after the connection is established. The electronic device 140 herein may include a smart phone, a tablet computer, an intelligent television, an e-book reader, a multi-media player, a laptop computer, a desk computer, or any device including a processor and a communication circuitry that is configured to establish the connection between the air cleaner 120 and the electronic device 140.

The sensor 160 is disposed at the movable article, and may be disposed in the same room as the air cleaner 120. For example, the sensor 160 may include one or more door-and-window sensors disposed at a door and/or a window. The movable article may include any structure configured to control an air path between the room and the outside environment. The sensor 160 may obtain an open/closed status of a door and/or a window, establish connection with the air cleaner 120 in a wired network manner or in a wireless network manner, and interact with the air cleaner 120 after the connection is established.

The network-side device 180 connects with the air cleaner 120, the electronic device 140, and the door-and-window sensor 160 respectively in a wired network manner or in a wireless network manner, and may interact with any one or at least one of the electronic device 140, the air cleaner 120, and the door-and-window sensor 160 after the connection is established. The network-side device 180 herein may be a network-side device (such as a server or a router), or a network-side device group consisting of some network-side devices, or a cloud computing service center. For example, the network-side device 180 herein may be a router located in the same local area network as the air cleaner 120, the electronic device 140, and the door-and-window sensor 160.

Figure 2:
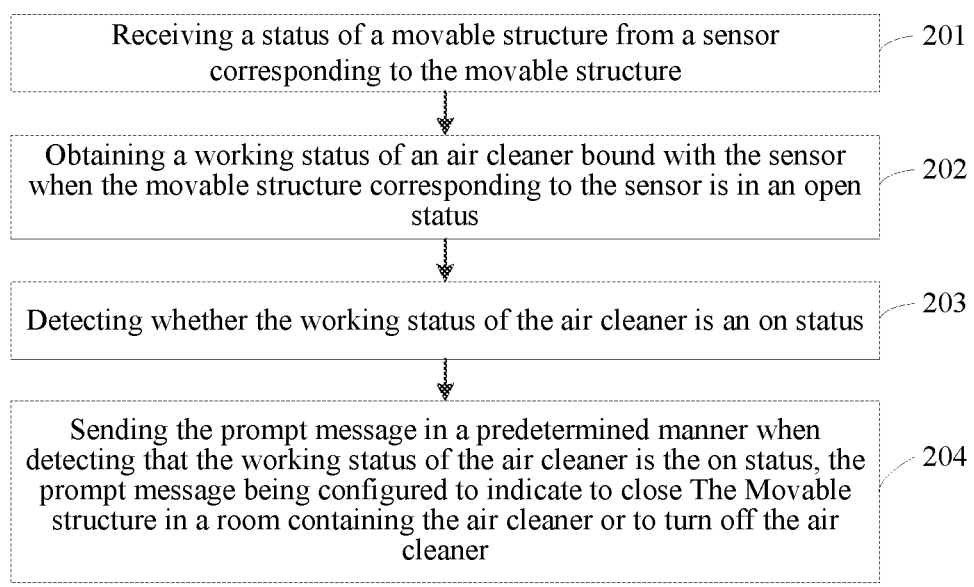
FIG. 2 is a flow chart of a method for sending a prompt message according to an exemplary embodiment.

FIG. 2 is a flow chart of a method for sending a prompt message according to an exemplary embodiment. As shown in FIG. 2, the method may be applied to the network-side device 180 in the implementation environment shown in FIG. 1, including the following steps.

In step 201, the network-side device receives a status of a movable article from a sensor. The movable article may include one or more structure in a room. For example, the network-side device may receive an open/closed status of a door and window corresponding to a door-and-window sensor.

In step 202, the network-side device obtains a working status of an air cleaner bound with the sensor when at least one of the door and window corresponding to the door-and-window sensor is in an open status. For example, the air cleaner is bound with the sensor when they are associated with a user account and both of their identifiers are stored in a table related to the user account. Alternatively or additionally, the air cleaner may be bound with the sensor when both of them communicate with each other using a communication channel, which may be a wireless channel or a wired channel in a network.

In step 203, the network-side device detects whether the working status of the air cleaner is an on status. The on status indicates that the air cleaner is working to purify the air.

In step 204, the network-side device sends the prompt message in a predetermined manner when it is detected that the working status of the air cleaner is the on status, where the prompt message is configured to indicate to close the movable article or to turn off the air cleaner. For example, the prompt message may request the user to select whether to close at least one of the door and window in a room containing the air cleaner or whether to turn off the air cleaner in the room.

Thus, with the method for sending the prompt message according to the embodiments of the present disclosure, the prompt message is sent if the network-side device determines that the air cleaner is in the working status and at least one of the door and window of the room where the air cleaner is located is open. Since the network-side device can determine whether at least one of the door and window of the room is open when the air cleaner in the room works, according to the working status uploaded by the air cleaner and the open/closed status of the door and window uploaded by the door-and-window sensor, the network-side device can prompt to close at least one of the door and window or to turn off the air cleaner if the at least one of the door and window is open. Consequently, the problem of low purification efficiency of the air cleaner due to an opened door or window is solved, so as to improve the purification efficiency of the air cleaner.

Figure 3A:
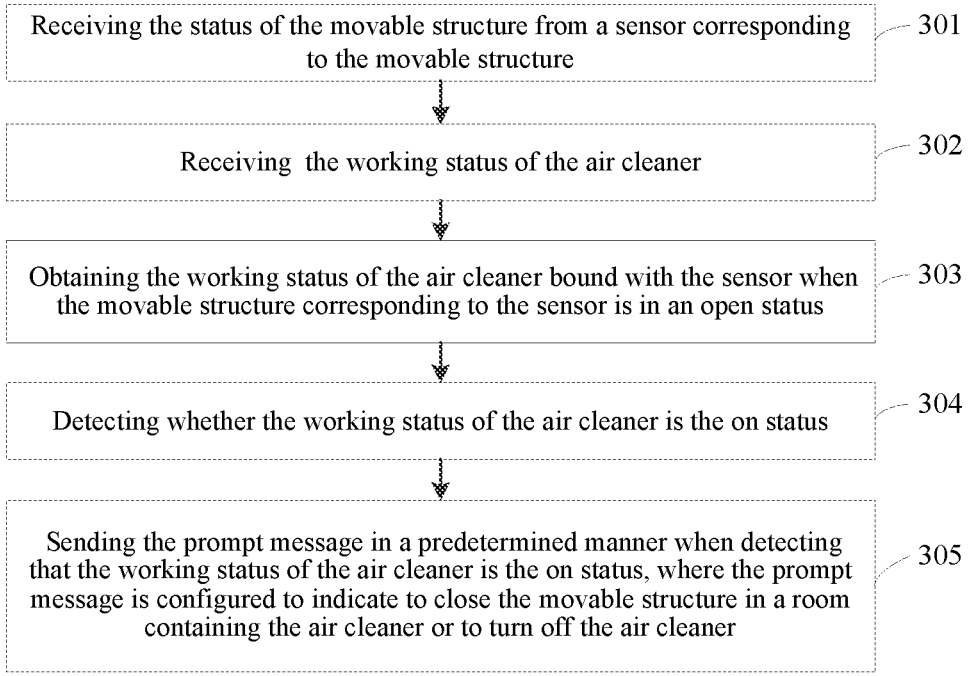
FIG. 3A is a flow chart of a method for sending a prompt message according to an exemplary embodiment.

FIG. 3A is a flow chart of a method for sending a prompt message according to another exemplary embodiment. As shown in FIG. 3A, the method is applied to the network-side device 180 in the implementation environment shown in FIG. 1, including the following steps.

In step 301, the network-side device receives the status of the movable structure from a sensor corresponding to the movable structure. The network-side device may receive the open/closed status of the door and window corresponding to the door-and-window sensor.

The door-and-window sensor may be disposed on the door and window, and may sense whether at least one of the door and window is opened or closed.

Alternatively, the door-and-window sensor may not be located on the door and window. For example, the sensor may be disposed on the wall near the movable article. In other words, the sensor may sense whether at least one of the movable article is opened or closed, no matter where the sensor is disposed.

Alternatively or additionally, the door-and-window sensor may control whether to open or close at least one of the door and window corresponding to the door-and-window sensor.

The network-side device may receive the open/closed status of the door and window corresponding to the door-and-window sensor from different terminals, when receiving the open/closed status of the door and window corresponding to the door-and-window sensor, which may usually include the following three situations.

In a first situation, the network-side device receives the open/closed status of the door and window sent directly by the door-and-window sensor. The open/closed status herein refers to an open status or a closed status.

The door-and-window sensor may directly send the open/closed status of the door and window to the network-side device via the network, after the open/closed status of the door and window is sensed. Correspondingly, the network-side device may receive the open/closed status of the door and window sent by the door-and-window sensor.

Alternatively or additionally, the door-and-window sensor may send the open/closed status of the door and window sensed to the network-side device at a preset time, in terms of sending the open/closed status of the door and window sensed to the network-side device. The preset time may be a corresponding time point at preset time intervals, or may be a time point after the door-and-window sensor is connected with the network-side device.

Alternatively or additionally, the network-side device may also receive a door-and-window sensor identifier sent by the door-and-window sensor when receiving the open/closed status of the door and window sent by the door-and-window sensor, in which the door-and-window sensor identifier is configured to position and identify the door-and-window sensor. Alternatively, the door-and-window sensor identifier may be sent, along with the open/closed status of the door and window, to the network-side device. Alternatively, the door-and-window sensor identifier may be regarded as part of the open/closed status. That is, the network-side device may receive the door-and-window sensor identifier at the same time of receiving the open/closed status of the door and window, or may only receive the open/closed status that includes the door-and-window sensor identifier corresponding to the door and window.

In a second situation, the network-side device receives the open/closed status of the door and window from an electronic device. For example, the open/closed status is sent by an electronic device connected with the door-and-window sensor. The electronic device may need a user account and other credentials to get access to the status of the sensor.

As shown in FIG. 1, the door-and-window sensor may be connected with the electronic device. Thus, the door-and-window sensor may send the open/closed status of the door and window to the electronic device connected with the door-and-window sensor, after sensing the open/closed status of the door and window corresponding to the door-and-window sensor. The electronic device may send the open/closed status of the door and window to the network-side device using the user account. For example, the user account may refer to the user login account on the router, where the electronic device and the router may both have access to a storage associated with the user account. The storage may be part of the router or part of a remote server. Correspondingly, the network-side device may receive the open/closed status of the door and window sent via the user account by the electronic device connected with the door-and-window sensor and obtained by the door-and-window sensor.

In a third situation, the open/closed status of the door and window is received, in which the open/closed status is sent by the air cleaner connected with the door-and-window sensor and obtained by the door-and-window sensor.

It can be known from the environment shown in FIG. 1 that the door-and-window sensor may be connected with the air cleaner. Thus, the door-and-window sensor may send the open/closed status of the door and window to the air cleaner connected with the door-and-window sensor, after sensing the open/closed status of the door and window corresponding to the door-and-window sensor; and the air cleaner sends the open/closed status of the door and window to the network-side device via the network. Correspondingly, the network-side device may receive the open/closed status of the door and window sent by the air cleaner connected with the door-and-window sensor and obtained by the door-and-window sensor.

Alternatively or additionally, the air cleaner may also send an air cleaner identifier when sending the open/closed status of the door and window to the network-side device, in which the air cleaner identifier is configured to identify the air cleaner solely. Correspondingly, the network-side device may also receive the air cleaner identifier at the same time of receiving the open/closed status of the door and window sent by the air cleaner. Alternatively, the air cleaner identifier may further be sent, as part of the open/closed status of the door and window, to the network-side device, and correspondingly, the network-side device receives the open/closed status of the door and window sent by the air cleaner, in which the open/closed status of the door and window may further include the air cleaner identifier.

Alternatively or additionally, the air cleaner may also obtain the door-and-window sensor identifier of the door-and-window sensor when obtaining the open/closed status of the door and window from the door-and-window sensor, and may further send at least one of the door-and-window sensor identifier and the air cleaner identifier to the network-side device when sending the open/closed status of the door and window to the network-side device. Correspondingly, the network-side device may also receive at least one of the door-and-window sensor identifier and the air cleaner identifier when receiving the open/closed status of the door and window sent by the air cleaner.

That is, in the application environment shown in FIG. 1, after sensing the open/closed status of the door and window corresponding to the door-and-window sensor, the door-and-window sensor may directly send the open/closed status of the door and window to the network-side device, or send the open/closed status of the door and window to the electronic device connected with the door-and-window sensor or to the air cleaner, and then the electronic device or the air cleaner sends the open/closed status of the door and window to the network-side device. Correspondingly, the network-side device may receive the open/closed status of the door and window directly sent by the door-and-window sensor, or sent by the electronic device via the user account, or sent by the air cleaner.

In step 302, the working status of the air cleaner is received.

The working status of the air cleaner may be a started working mode or a shut-off mode. That is, the working status of the air cleaner is configured to indicate whether the air cleaner is working.

According to the application environment shown in FIG. 1, the network-side device may receive the working status of the air cleaner in at least three situations.

In a first situation, the working status of the air cleaner sent by the air cleaner is received.

The air cleaner may directly send the working status thereof to the network-side device, in which case, the air cleaner still may send the shut-off mode to the network-side device when the air cleaner is in the shut-off mode. Correspondingly, the network-side device may receive the working status of the air cleaner sent by the air cleaner.

Alternatively, the air cleaner may send the working status thereof to the network-side device in both of the started working mode and the shut-off mode.

In a second situation, the working status of the air cleaner is received, in which the working status is sent by the door-and-window sensor connected with the air cleaner and obtained by the air cleaner.

The air cleaner may be connected with a sensor such as the door-and-window sensor. The door-and-window sensor herein may be located on the door and window of the room containing the air cleaner, and may obtain the working status of the air cleaner sent by the air cleaner connected with the air cleaner and send the working status of the air cleaner to the network-side device. Correspondingly, the network-side device may receive the working status of the air cleaner sent by the door-and-window sensor connected with the air cleaner and obtained by the air cleaner.

In a third situation, the working status of the air cleaner is received, in which the working status is sent via a user account by an electronic device connected with the air cleaner and obtained by the air cleaner.

The air cleaner may be connected with the electronic device. The electronic device sends the working status of the air cleaner to the network-side device via the user account after obtaining the working status of the air cleaner connected with the air cleaner. Correspondingly, the network-side device may receive the working status of the air cleaner sent via the user account by the electronic device connected with the air cleaner and obtained by the air cleaner.

In order to make the network-side device know which air cleaner the working status belongs to, the working status may usually include an air cleaner identifier of an air cleaner, and the air cleaner identifier herein is configured to identify the air cleaner solely.

In step 303, the working status of the air cleaner bound with the sensor is obtained when at least one of the movable structures corresponding to the sensor is in an open status.

For example, when at least one of the door and window corresponding to the door-and-window sensor is in the open status, and when the air cleaner of the room is in an on status, the purification efficiency of the air cleaner may be very low especially when the air quality outside is very poor. Hence, when at least one of the door and window corresponding to the door-and-window sensor is in the open status, the network-side device may obtain the working status of the air cleaner bound with the door-and-window sensor, so as to avoid the energy consumption of the air cleaner started.

Figure 3B:
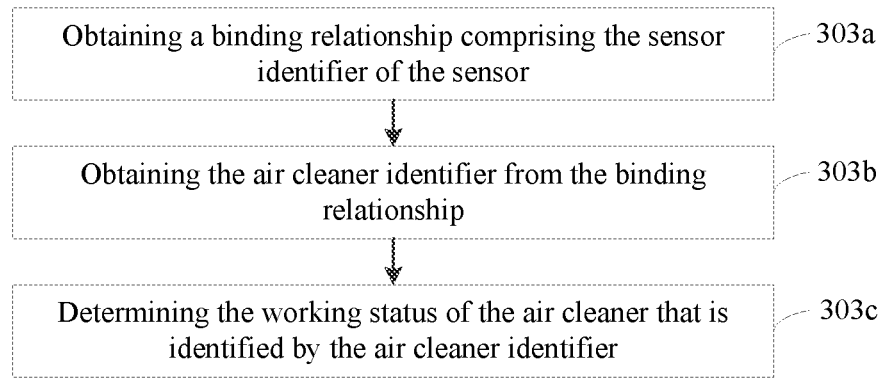
FIG. 3B is a flow chart of obtaining a working status of an air cleaner bound with a sensor according to an exemplary embodiment.

FIG. 3B is a flow chart of obtaining a working status of an air cleaner bound with a sensor according to an exemplary embodiment, obtaining the working status of the air cleaner bound with the sensor by the network-side device may include the following steps 303a to 303c.

In step 303a, the network-side device obtains a binding relationship comprising a sensor identifier of the sensor. For example, the network-side device may obtain the binding relationship containing the door-and-window sensor identifier of the door-and-window sensor.

The binding relationship containing the door-and-window sensor identifier may be stored in the network-side device. The binding relationship at least includes the air cleaner identifier configured to indicate the door-and-window sensor and the air cleaner bound together. The door-and-window sensor and the air cleaner bound together are usually located in the same room or the same space to be purified.

In step 303b, the air cleaner identifier is obtained from the binding relationship.

In step 303c, the device determines the working status of the air cleaner that is identified by the air cleaner identifier.

When the air cleaner identifier and the sensor identifier are stored in the same binding relationship, it shows that the air cleaner corresponding to the air cleaner identifier and the moveable structure corresponding to the sensor identifier are located in the same room or the same space to be purified. For example, when the movable structure includes a door and/or a winder, if at least one of the door and window corresponding to the door-and-window sensor is in the open status, the working status of the air cleaner in the same room or the same space to be purified may be obtained.

Figure 3C:
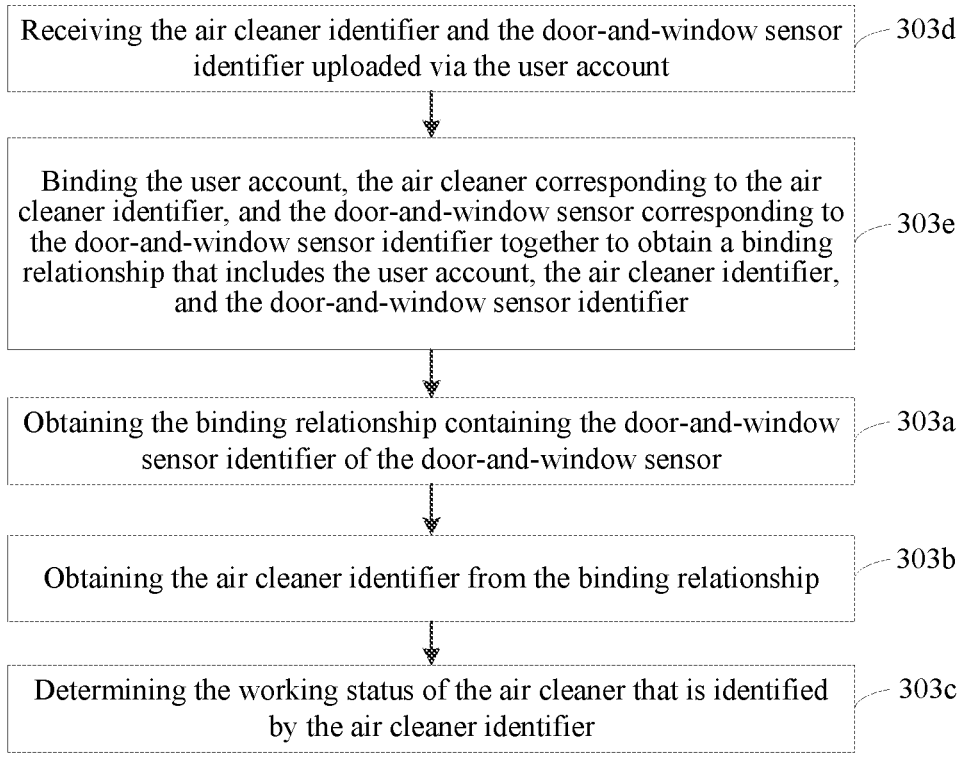
FIG. 3C is a flow chart of storing a binding relationship according to an exemplary embodiment.

In practical applications, the binding relationship needs to be stored before the network-side device is able to obtain the working status of the air cleaner bound with the door-and-window sensor. The process of storing the binding relationship by the network-side device may refer to FIG. 3C that is a flow chart of storing a binding relationship according to an exemplary embodiment. In FIG. 3C, storing the binding relationship by the network-side device may include the following steps 303d to 303e.

In step 303d, the network-side device receives the air cleaner identifier and the door-and-window sensor identifier uploaded via the user account. For example, a user account may be associated with one or more smart devices, where the identifications of the associated smart device are stored in a table associated with the user account.

Alternatively or additionally, the electronic device may upload the air cleaner identifier obtained from the air cleaner and the door-and-window sensor identifier obtained from the door-and-window sensor to the network-side device via the user account. Correspondingly, the network-side device may receive the air cleaner identifier and the door-and-window sensor identifier associated with the user account from a pre-stored table on the wireless router.

In step 303e, the user account, the air cleaner corresponding to the air cleaner identifier, and the door-and-window sensor corresponding to the door-and-window sensor identifier are bound together to obtain a binding relationship that includes the user account, the air cleaner identifier, and the door-and-window sensor identifier.

After the network-side device receives the air cleaner identifier and the door-and-window sensor identifier uploaded via the user account, it can be determined that the electronic device where the user account is logged in, the air cleaner corresponding to the air cleaner identifier, and the door-and-window sensor corresponding to the door-and-window sensor identifier are located in the same room or space to be purified. Thus, it is possible to bind the user account, the air cleaner corresponding to the air cleaner identifier, and the door-and-window sensor corresponding to the door-and-window sensor identifier together to obtain a binding relationship that includes the user account, the air cleaner identifier, and the door-and-window sensor identifier.

Generally, the steps 303a to 303c are not implemented till the steps 303d and 303e are completed.

In step 304, it is detected whether the working status of the air cleaner is the on status.

The working status of the air cleaner usually includes the on status configured to indicate that the air cleaner has started the purification function, and the stopping status configured to indicate that the air cleaner has shut off the purification function.

In step 305, the prompt message is sent in a predetermined manner when it is detected that the working status of the air cleaner is the on status, in which the prompt message is configured to indicate to close the at least one of the door and window in a room containing the air cleaner or to turn off the air cleaner.

If the network-side device detects that the air cleaner bound with the door-and-window sensor is in the working status, it shows that the purification efficiency of the air cleaner is relatively low. In order to avoid resource waste due to purification, the network-side device sends the prompt message in the predetermined manner to the user, which may include the following three situations.

In a first situation, the prompt message is sent to the air cleaner.

The network-side device may directly send the prompt message to the air cleaner, the prompt message being configured to indicate to close at least one of the door and window in the room containing the air cleaner or to turn off the air cleaner, and correspondingly, the air cleaner may display the prompt message in a display screen disposed, or may play an audio prompt message, so as to prompt to close at least one of the door and window in the room containing the air cleaner or to turn off the air cleaner.

In a second situation, the prompt message is sent to the door-and-window sensor bound with the air cleaner.

The network-side device may directly send the prompt message to the door-and-window sensor bound with the air cleaner, the prompt message being configured to indicate to close at least one of the door and window in the room containing the air cleaner or to turn off the air cleaner, and correspondingly, the door-and-window sensor may display the prompt message in a display screen disposed, or may play an audio prompt message, so as to prompt to close at least one of the door and window in the room containing the air cleaner or to turn off the air cleaner.

In a third situation, the prompt message is sent to an electronic device associated with a user account bound with the air cleaner. For example, the electronic device is associated with the user account when the user account has been used to log into an application installed in the electronic device.

The network-side device may directly send the prompt message to the electronic device where the user account bound with the air cleaner has been logged in. The prompt message is configured to indicate to close at least one of the door and window in the room containing the air cleaner or to turn off the air cleaner. Correspondingly, the electronic device may display the prompt message in a display screen disposed, or may play an audio prompt message, so as to prompt to close at least one of the door and window in the room containing the air cleaner or to turn off the air cleaner.

Alternatively, when the user account is logged in on the electronic device, an identifier of the electronic device may be uploaded to the network-side device, and correspondingly the network-side device may store the identifier of the electronic device where the user account has been logged in. Hence, the network-side device may obtain the electronic device where the user account bound with the air cleaner has been logged in, and send the prompt message to the electronic device.

Alternatively, the network-side device may send the prompt message to an electronic device where the user account bound with the air cleaner has been logged in, so as to send the user the prompt message in an efficient way.

Thus, with the method for sending the prompt message according to the embodiments of the present disclosure, the prompt message is sent if the network-side device determines that the air cleaner is in the working status and at least one of the door and window of the room where the air cleaner is located is open. Since the network-side device can determine whether at least one of the door and window of the room is open when the air cleaner in the room works, according to the working status uploaded by the air cleaner and the open/closed status of the door and window uploaded by the door-and-window sensor, the network-side device can prompt to close at least one of the door and window or to turn off the air cleaner if the at least one of the door and window is open. Consequently, the problem of low purification efficiency of the air cleaner due to an opened door or window is solved, so as to improve the purification efficiency of the air cleaner.

Furthermore, in the method for sending the prompt message according to the embodiments of the present disclosure, the door-and-window sensor, the air cleaner and the user account logged in on the electronic device are bound, so as to find out the air cleaner bound with the started door and/or window according to the binding relationship, and so as to determine whether to send the prompt message according to the working status of the air cleaner. Consequently, it is possible to solve the problem of low purification effect of the air cleaner due to the opened door and/or window, and to guarantee to send the prompt message in an efficient manner, such that the user can turn off the air cleaner or at least one of the door and window of the room where the air cleaner is as soon as possible, so as to improve the purification efficiency of the air cleaner.

In a possible implementation, when detecting that at least one of the door and window corresponding to the door-and-window sensor is in the open status and the air cleaner bound with the door-and-window sensor is in the working status, the network-side device may directly control the air cleaner to stop or control the at least one of the door and window to close, to avoid a case where the air cleaner or the door and/or window cannot be closed in time if the user is not at home or does not notice the prompt message. In such a case, the method for sending the prompt message may include at least one of the following three situations.

In a first situation, a first closing instruction is sent to the air cleaner, and the first closing instruction is configured to indicate the air cleaner to turn off its own purification function automatically.

The network-side device may directly send the first closing instruction to the air cleaner. The first closing instruction is configured to indicate the air cleaner to turn off the purification function of the air cleaner automatically, and correspondingly, the air cleaner may directly stop the working mode in operation upon receiving the first closing instruction.

In a second situation, a second closing instruction is sent to the door-and-window sensor, and the second closing instruction is configured to indicate the door-and-window sensor to close at least one of the door and window corresponding to the door-and-window sensor.

The network-side device may directly send the second closing instruction to the door-and-window sensor, the second closing instruction being configured to indicate the door-and-window sensor to close at least one of the door and window corresponding to the door-and-window sensor, and correspondingly, the door-and-window sensor may control the door and/or window corresponding to the door-and-window sensor to close upon receiving the second closing instruction.

In a third situation, a third closing instruction is sent to the electronic device, and the third closing instruction is configured to indicate the electronic device to turn off the air cleaner or to close the at least one of the door and window.

The network-side device may directly send the third closing instruction to the electronic device, or send the third closing instruction to the electronic device via the user account, and the third closing instruction is configured to indicate the electronic device to turn off the air cleaner or to close the at least one of the door and window. Correspondingly, the electronic device may inform the user of closing the air cleaner or the at least one of the door and window immediately upon receiving the third closing instruction.

Thus, with the method for sending the prompt message according to the embodiments of the present disclosure, the closing instruction can be directly sent to the door-and-window sensor or the air cleaner, so as to close at least one of the door and window or to turn off the air cleaner automatically, such that it is guaranteed that the air cleaner or the door and/or window may be closed automatically even if the user is not at home or does not notice the prompt message, so as to improve the purification efficiency of the air cleaner or reduce the resource consumption due to purification.

An apparatus embodiment of the present disclosure in the following may execute acts in the method embodiments of the present disclosure. As for undisclosed details of the apparatus embodiment of the present disclosure, reference may be made to the method embodiment of the present disclosure.

Figure 4:
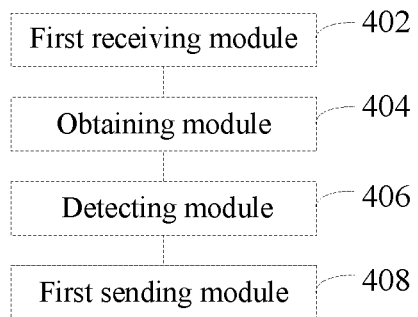
FIG. 4 is a block diagram of an apparatus for sending a prompt message according to an exemplary embodiment.

FIG. 4 is a block diagram of an apparatus for sending a prompt message according to an exemplary embodiment. As shown in FIG. 4, the apparatus is applied to the network-side device 180 in the implementation environment shown in FIG. 1. The apparatus includes but is not limited to a first receiving module 402, an obtaining module 404, a detecting module 406 and a first sending module 408.

The first receiving module 402 is configured to receive an open/closed status of a door and window corresponding to a door-and-window sensor. The obtaining module 404 is configured to obtain a working status of an air cleaner bound with the door-and-window sensor when at least one of the door and window corresponding to the door-and-window sensor is in an open status. The detecting module 406 is configured to detect whether the working status of the air cleaner is an on status. The first sending module 408 is configured to send the prompt message in a predetermined manner if the detecting module 406 detects that the working status of the air cleaner is the on status, in which the prompt message is configured to indicate to close the at least one of the door and window in a room containing the air cleaner or to turn off the air cleaner.

Thus, with the apparatus for sending the prompt message according to the embodiments of the present disclosure, the prompt message is sent if the network-side device determines that the air cleaner is in the working status and at least one of the door and window of the room where the air cleaner is located is open. Since the network-side device can determine whether at least one of the door and window of the room is open when the air cleaner in the room works, according to the working status uploaded by the air cleaner and the open/closed status of the door and window uploaded by the door-and-window sensor, the network-side device can prompt to close at least one of the door and window or to turn off the air cleaner if the door and window is open. Consequently, the problem of low purification efficiency of the air cleaner due to an opened door or window is solved, so as to improve the purification efficiency of the air cleaner.

Figure 5:
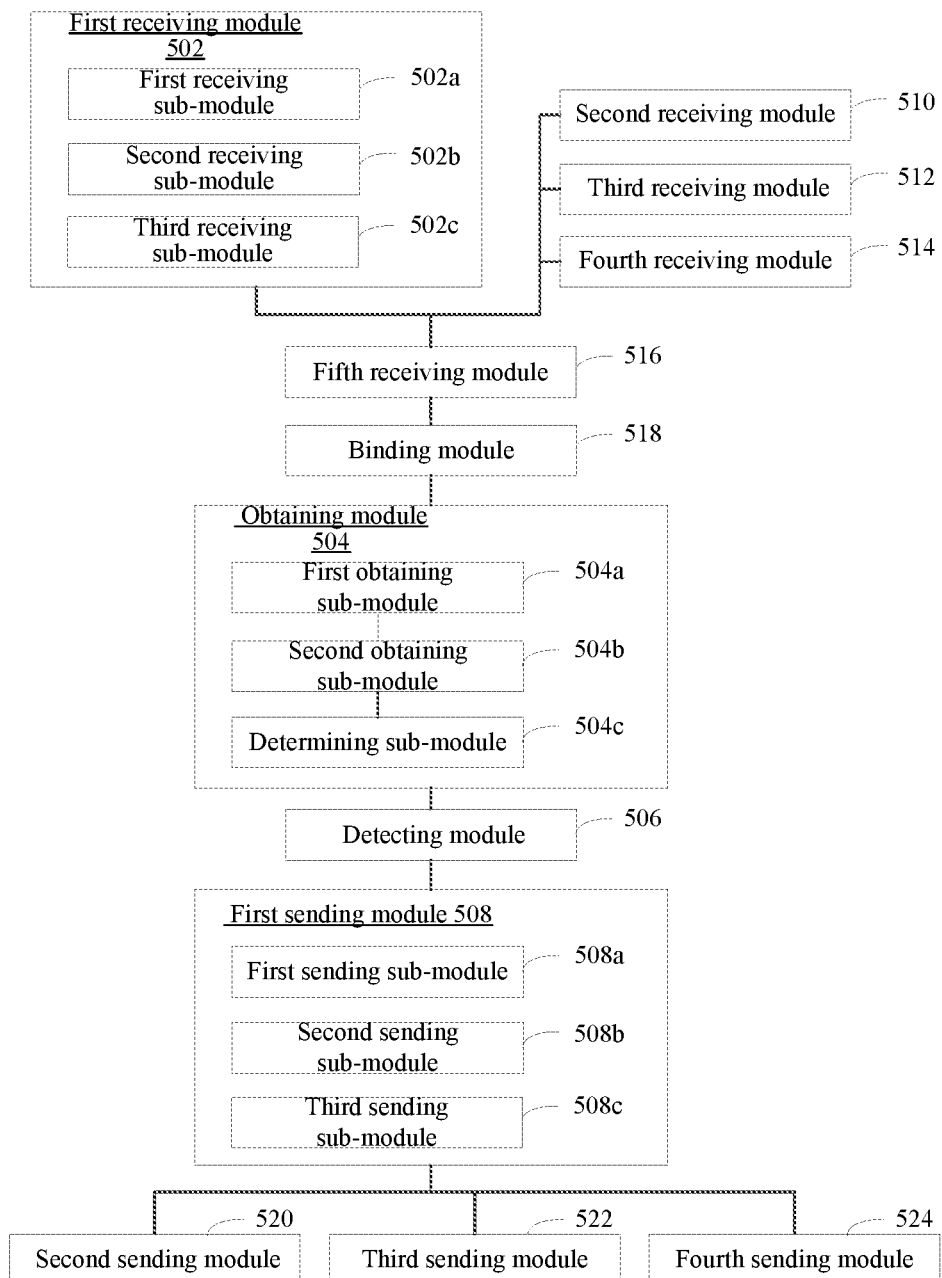
FIG. 5 is a block diagram of an apparatus for sending a prompt message according to another exemplary embodiment.

FIG. 5 is a block diagram of an apparatus for sending a prompt message according to another exemplary embodiment. As shown in FIG. 5, the apparatus is applied to the network-side device 180 in the implementation environment shown in FIG. 1. The apparatus includes but is not limited to a first receiving module 502, an obtaining module 504, a detecting module 506 and a first sending module 508.

The first receiving module 502 is configured to receive an open/closed status of a door and window corresponding to a door-and-window sensor. The obtaining module 504 is configured to obtain a working status of an air cleaner bound with the door-and-window sensor when at least one of the door and window corresponding to the door-and-window sensor is in an open status. The detecting module 506 is configured to detect whether the working status of the air cleaner is an on status. The first sending module 508 is configured to send the prompt message in a predetermined manner if the detecting module 506 detects that the working status of the air cleaner is the on status, in which the prompt message is configured to indicate to close the at least one of the door and window in a room containing the air cleaner or to turn off the air cleaner.

Alternatively or additionally, the first receiving module 502 may include: a first receiving sub-module 502a, or a second receiving sub-module 502b, or a third receiving sub-module 502c. The first receiving sub-module 502a is configured to receive the open/closed status of the door and window sent by the door-and-window sensor. The second receiving sub-module 502b is configured to receive the open/closed status of the door and window sent via a user account by an electronic device connected with the door-and-window sensor and obtained by the door-and-window sensor. The third receiving sub-module 502c is configured to receive the open/closed status of the door and window sent by the air cleaner connected with the door-and-window sensor and obtained by the door-and-window sensor.

Alternatively or additionally, the apparatus may further include: a second receiving module 510, or a third receiving module 512, or a fourth receiving module 514.

The second receiving module 510 is configured to receive the working status of the air cleaner sent by the air cleaner. The third receiving module 512 is configured to receive the working status of the air cleaner sent by the door-and-window sensor connected with the air cleaner and obtained by the air cleaner. The fourth receiving module 514 is configured to receive the working status of the air cleaner sent via a user account by an electronic device connected with the air cleaner and obtained by the air cleaner. The working status includes an air cleaner identifier of the air cleaner.

Alternatively or additionally, the apparatus may further include: a fifth receiving module 516 and a binding module 518.

The fifth receiving module 516 is configured to receive an air cleaner identifier and a door-and-window sensor identifier uploaded via a user account. The binding module 518 is configured to bind the user account, the air cleaner corresponding to the air cleaner identifier, and the door-and-window sensor corresponding to the door-and-window sensor identifier together to obtain a binding relationship that includes the user account, the air cleaner identifier, and the door-and-window sensor identifier.

Alternatively or additionally, the obtaining module 504 may include: a first obtaining sub-module 504a, a second obtaining sub-module 504b, and a determining sub-module 504c.

The first obtaining sub-module 504a is configured to obtain the binding relationship containing the door-and-window sensor identifier of the door-and-window sensor. The second obtaining sub-module 504b is configured to obtain the air cleaner identifier from the binding relationship obtained by the first obtaining sub-module 504a. The determining sub-module 504c is configured to determine the working status of the air cleaner that is identified by the air cleaner identifier, which is obtained by the second obtaining sub-module 504b.

Alternatively or additionally, the first sending module 508 may include: a first sending sub-module 508a, or a second sending sub-module 508b, or a third sending sub-module 508c.

The first sending sub-module 508a is configured to send the prompt message to the air cleaner. The second sending sub-module 508b is configured to send the prompt message to the door-and-window sensor bound with the air cleaner. The third sending sub-module 508c is configured to send the prompt message to an electronic device where the user account bounded with the air cleaner has been logged in.

Alternatively or additionally, the apparatus may further include: a second sending module 520, a third sending module 522, and a fourth sending module 524.

The second sending module 520 is configured to send a first closing instruction to the air cleaner, in which the first closing instruction is configured to indicate the air cleaner to turn off a purification function of the air cleaner automatically. The third sending module 522 is configured to send a second closing instruction to the door-and-window sensor, in which the second closing instruction is configured to indicate the door-and-window sensor to close at least one of the door and window corresponding to the door-and-window sensor. The fourth sending module 524 is configured to send a third closing instruction to the electronic device, the third closing instruction configured to indicate the electronic device to turn off the air cleaner or to close the at least one of the door and window.

Thus, with the apparatus for sending the prompt message according to the embodiments of the present disclosure, the prompt message is sent if the network-side device determines that the air cleaner is in the working status and at least one of the door and window of the room where the air cleaner is located is open. Since the network-side device can determine whether at least one of the door and window of the room is open when the air cleaner in the room works, according to the working status uploaded by the air cleaner and the open/closed status of the door and window uploaded by the door-and-window sensor, the network-side device may prompt a message on a terminal to close at least one of the door and window or to turn off the air cleaner if the at least one of the door and window is open. Consequently, the problem of low purification efficiency of the air cleaner due to an opened door or window is solved, so as to improve the purification efficiency of the air cleaner.

Furthermore, with the apparatus for sending the prompt message according to the embodiments of the present disclosure, the door-and-window sensor, the air cleaner and the user account logged in on the electronic device are bound, so as to find out the air cleaner bound with the started door and/or window according to the binding relationship, and so as to determine whether to send the prompt message according to the working status of the air cleaner. Consequently, it is possible to solve the problem of low purification effect of the air cleaner due to the opened door and/or window, and to guarantee to send the prompt message in an efficient manner, such that the user can turn off the air cleaner or the door and/or window of the room where the air cleaner is as soon as possible, so as to improve the purification efficiency of the air cleaner.

The apparatus for sending the prompt message according to the embodiments of the present disclosure may directly the closing instruction to the door-and-window sensor or the air cleaner to close at least one of the door and window or to turn off the air cleaner automatically, such that the air cleaner or the door and/or window may be closed automatically even if the user is not at home or does not notice the prompt message, so as to improve the purification efficiency of the air cleaner or reduce the resource consumption due to purification.

With respect to the apparatuses in the above embodiments, the specific manners for performing operations for individual modules therein have been described in detail in the embodiments regarding the methods for sending a prompt message, which will not be elaborated herein.

An apparatus for sending a prompt message is provided by an exemplary embodiment of the present disclosure, and may realize the method for sending a prompt message according to the present disclosure. The apparatus includes: a processor and a memory configured to store an instruction executable by the processor, in which the processor is configured to receive an open/closed status of a door and window corresponding to a door-and-window sensor, to obtain a working status of an air cleaner bound with the door-and-window sensor when at least one of the door and window corresponding to the door-and-window sensor is in an open status, to detect whether the working status of the air cleaner is an on status, and to send the prompt message in a predetermined manner when it is detected that the working status of the air cleaner is the on status, in which the prompt message is configured to indicate to close the at least one of the door and window in a room containing the air cleaner or to turn off the air cleaner.

Figure 6:
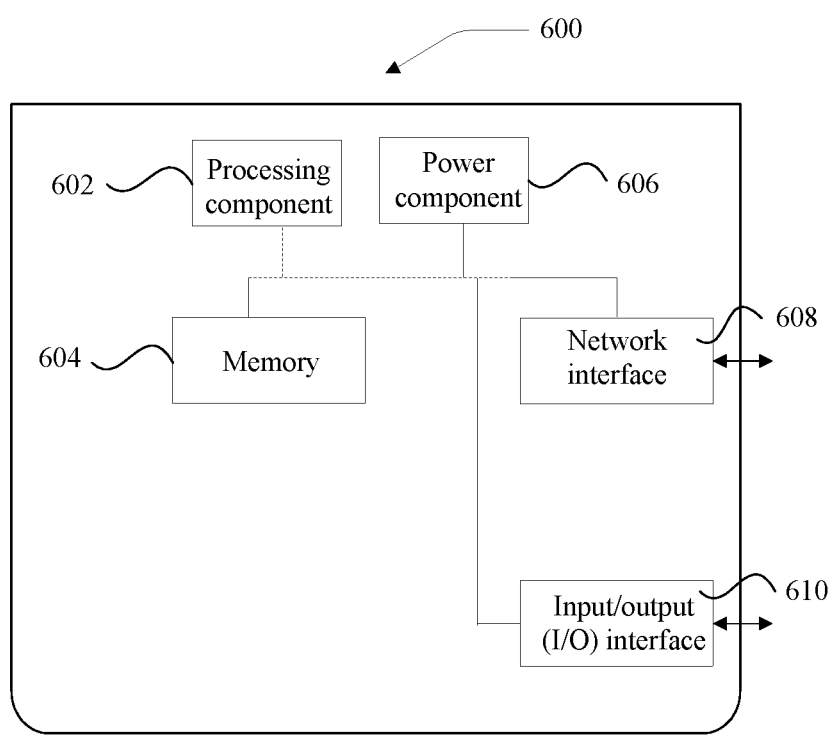
FIG. 6 is a block diagram of an apparatus for sending a prompt message according to an exemplary embodiment.

FIG. 6 is a block diagram of an apparatus for sending a prompt message according to an exemplary embodiment. For example, an apparatus 600 may be provided as a network-side device. Referring to FIG. 6, the apparatus 600 includes a processing component 602 that further includes one or more processors, and a memory resource represented by a memory 604 and configured to store instructions executable by the processing component 602, for example, an application program. The application program stored in the memory 604 may include one or more modules discussed above. In addition, the processing component 602 is configured to execute the instructions to perform the methods for sending prompt messages described above.

The apparatus 600 may further include a power component 606 configured to execute power management of the apparatus 600, a wired or wireless network interface 608 configured to connect the apparatus 600 to a network, and an input/output (I/O) interface 610. The apparatus 600 may operate an operation system stored in the memory 604, such as Windows Server™, Mac OS X™, Unix™, Linux™, FreeBSD™, or the like.

In the disclosure, the apparatus 600 may be implemented with processing circuitry including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module may take the form of a packaged functional hardware unit designed for use with other components, a portion of a program code (e.g., software or firmware) executable by the processor 1220 or the processing circuitry that usually performs a particular function of related functions, or a self-contained hardware or software component that interfaces with a larger system, for example.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sending a prompt message, comprising:
   receiving, by a device comprising a processor and a communication circuitry, a status of a movable article from a sensor corresponding to the movable article;
   obtaining, by the device, a working status of an air cleaner bound with the sensor when the movable article corresponding to the sensor is in an open status;
   detecting, by the device, whether the working status of the air cleaner is an on status; and
   sending, by the device, the prompt message to a user in a predetermined manner when detecting that the working status of the air cleaner is the on status, wherein the prompt message is configured to indicate the user to close the movable article in a room containing the air cleaner or to turn off the air cleaner.

2. The method according to claim 1, wherein receiving the status of the movable article corresponding to the sensor comprises:
   receiving an open/closed status of the movable article sent by the sensor; or
   receiving the open/closed status of the movable article sent via a user account by an electronic device connected with the sensor and obtained by the sensor; or
   receiving the open/closed status of the movable article sent by the air cleaner connected with the sensor and obtained by the sensor.

3. The method according to claim 1, further comprising:
   receiving the working status of the air cleaner sent by the air cleaner; or
   receiving the working status of the air cleaner sent by the sensor connected with the air cleaner and obtained by the air cleaner; or
   receiving the working status of the air cleaner sent via a user account by an electronic device connected with the air cleaner and obtained by the air cleaner,
   wherein the working status comprises an air cleaner identifier of the air cleaner.

4. The method according to claim 1, further comprising:
   receiving an air cleaner identifier and a sensor identifier uploaded via a user account; and
   binding the user account, the air cleaner corresponding to the air cleaner identifier, and the sensor corresponding to the sensor identifier together to obtain a binding relationship that comprises the user account, the air cleaner identifier, and the sensor identifier.

5. The method according to claim 4, wherein obtaining the working status of the air cleaner bound with the sensor comprises:
   obtaining the binding relationship containing the sensor identifier of the sensor;
   obtaining the air cleaner identifier from the binding relationship; and
   determining the working status of the air cleaner that is identified by the air cleaner identifier.

6. The method according to claim 1, wherein sending the prompt message in the predetermined manner comprises:
   sending the prompt message to an electronic device associated with a user account of the user that is bound with the air cleaner.

7. The method according to claim 1, further comprising:
   sending a first closing instruction to the air cleaner, the first closing instruction being configured to instruct the air cleaner to turn off a purification function of the air cleaner automatically;
   sending a second closing instruction to the sensor, the second closing instruction being configured to instruct the sensor to close the movable article corresponding to the sensor; and
   sending a third closing instruction to an electronic device, the third closing instruction being configured to instruct the electronic device to turn off the air cleaner or to close the movable article.

8. An apparatus for sending a prompt message, comprising:
   a processor;
   a memory configured to store an instruction executable by the processor;
   wherein the processor is configured to:
   receive a status of a movable article corresponding to a sensor;
   obtain a working status of an air cleaner bound with the sensor when the movable article corresponding to the sensor is in an open status;
   detect whether the working status of the air cleaner is an on status; and
   send the prompt message to a user in a predetermined manner when it is detected that the working status of the air cleaner is the on status, wherein the prompt message is configured to indicate the user to close the at least one of the movable article in a room containing the air cleaner or to turn off the air cleaner.

9. The apparatus according to claim 8, wherein the processor is configured to receive the status of the movable article corresponding to the sensor by:
   receiving an open/closed status of the movable article sent by the sensor; or
   receiving the open/closed status of the movable article sent via a user account by an electronic device connected with the sensor and obtained by the sensor; or receiving the open/closed status of the movable article sent by the air cleaner connected with the sensor and obtained by the sensor.

10. The apparatus according to claim 8, wherein the processor is further configured to:
   receive the working status of the air cleaner sent by the air cleaner; or
   receive the working status of the air cleaner sent by the sensor connected with the air cleaner and obtained by the air cleaner; or
   receive the working status of the air cleaner sent via a user account by an electronic device connected with the air cleaner and obtained by the air cleaner,
   wherein the working status comprises an air cleaner identifier of the air cleaner.

11. The apparatus according to claim 8, wherein the processor is further configured to:
   receive an air cleaner identifier and a sensor identifier uploaded via a user account; and
   bind the user account, the air cleaner corresponding to the air cleaner identifier, and the sensor corresponding to the sensor identifier together to obtain a binding relationship that comprises the user account, the air cleaner identifier, and the sensor identifier.

12. The apparatus according to claim 11, wherein the processor is configured to obtain the working status of the air cleaner bound with the sensor by:
   obtaining the binding relationship containing the sensor identifier of the sensor;
   obtaining the air cleaner identifier from the binding relationship; and
   determining the working status of the air cleaner that is identified by the air cleaner identifier.

13. The apparatus according to claim 8, wherein the processor is configured to send the prompt message in the predetermined manner by:
   sending the prompt message to the air cleaner; or
   sending the prompt message to the sensor bound with the air cleaner; or
   sending the prompt message to an electronic device associated with a user account bound with the air cleaner.

14. The apparatus according to claim 8, wherein the processor is further configured to:
   send a first closing instruction to the air cleaner, the first closing instruction being configured to instruct the air cleaner to turn off a purification function of the air cleaner automatically;
   send a second closing instruction to the sensor, the second closing instruction being configured to instruct the sensor to close at least one of the movable article corresponding to the sensor; and
   send a third closing instruction to an electronic device, the third closing instruction being configured to instruct the electronic device to turn off the air cleaner or to close the at least one of the movable article.

15. A non-transitory computer-readable storage medium having stored therein instructions that, when executed by a processor of an electronic device, causes the electronic device to perform acts comprising:
   receiving an status of a movable article corresponding to a sensor;
   obtaining a working status of an air cleaner bound with the sensor when at least one of the movable article corresponding to the sensor is in an open status;
   detecting whether the working status of the air cleaner is an on status; and
   sending a prompt message to a user in a predetermined manner when detecting that the working status of the air cleaner is the on status, wherein the prompt message is configured to indicate the user to close the at least one of the movable article in a room containing the air cleaner or to turn off the air cleaner.

16. The non-transitory computer-readable storage medium according to claim 15, wherein the acts further comprise:
   sending a first closing instruction to the air cleaner, the first closing instruction being configured to instruct the air cleaner to turn off a purification function of the air cleaner automatically; and
   sending a second closing instruction to the sensor, the second closing instruction being configured to instruct the sensor to close at least one of the movable article corresponding to the sensor.

17. The non-transitory computer-readable storage medium according to claim 16, wherein the acts further comprise:
   sending a third closing instruction to an electronic device, the third closing instruction being configured to instruct the electronic device to turn off the air cleaner or to close the at least one of the movable article.

18. The non-transitory computer-readable storage medium according to claim 17, wherein the acts further comprise:
   displaying the prompt message in the electronic device.

19. The non-transitory computer-readable storage medium according to claim 15, wherein the acts further comprise:
   receiving an open/closed status of the movable article sent by the sensor; or
   receiving the open/closed status of the movable article sent via a user account by an electronic device connected with the sensor and obtained by the sensor; or
   receiving the open/closed status of the movable article sent by the air cleaner connected with the sensor and obtained by the sensor.

20. The non-transitory computer-readable storage medium according to claim 15, wherein the acts further comprise:
   receiving the working status of the air cleaner sent by the air cleaner; or
   receiving the working status of the air cleaner sent by the sensor connected with the air cleaner and obtained by the air cleaner; or
   receiving the working status of the air cleaner sent via a user account by an electronic device connected with the air cleaner and obtained by the air cleaner,
   wherein the working status comprises an air cleaner identifier of the air cleaner.

* * * * *